Nov. 10, 1925.

G. J. CONRAD 1,560,666

PLASTERING MACHINE

Filed May 11, 1925

Inventor
George J. Conrad,
Sterling P. Buck
Attorney

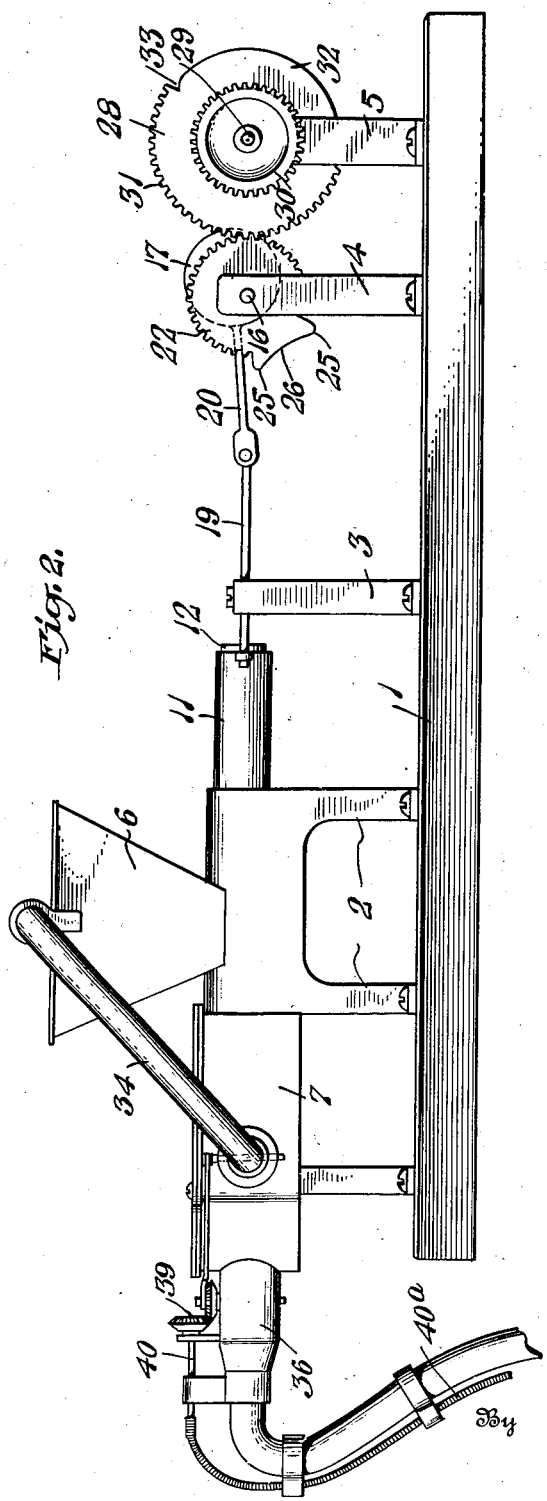

Nov. 10, 1925.
G. J. CONRAD
1,560,666
PLASTERING MACHINE
Filed May 11, 1925  4 Sheets-Sheet 3
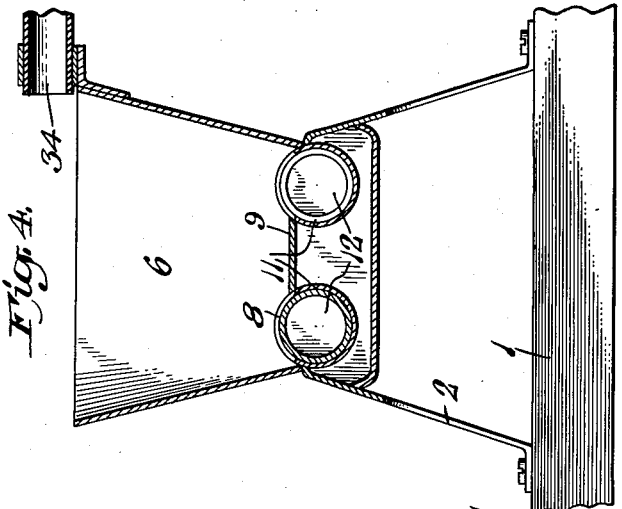
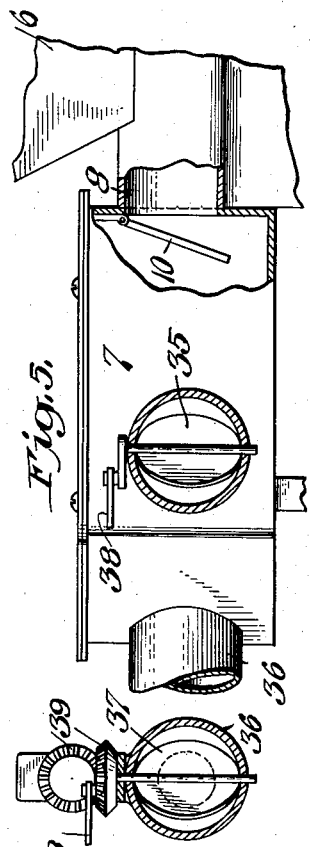
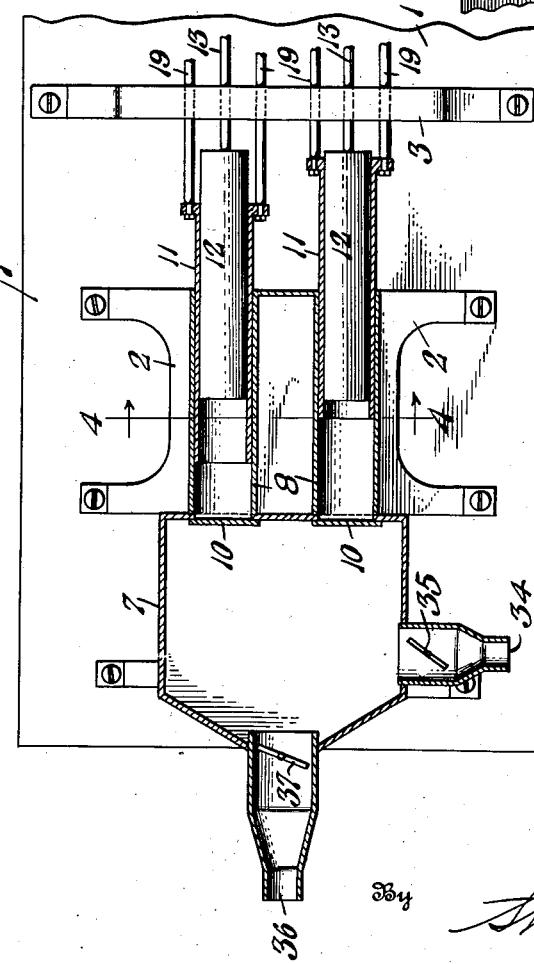
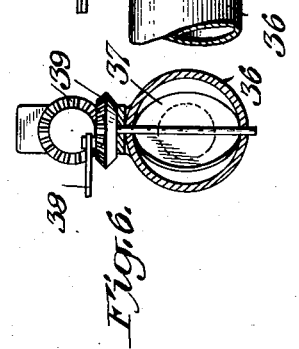
Inventor,
George J. Conrad,
By
Sterling P. Buck,
Attorney.

Nov. 10, 1925.  1,560,666
G. J. CONRAD
PLASTERING MACHINE
Filed May 11, 1925   4 Sheets-Sheet 4
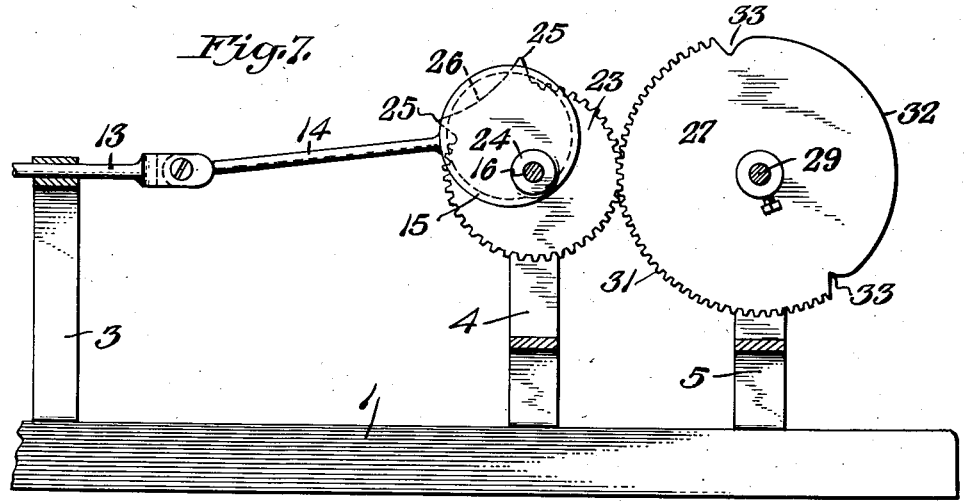
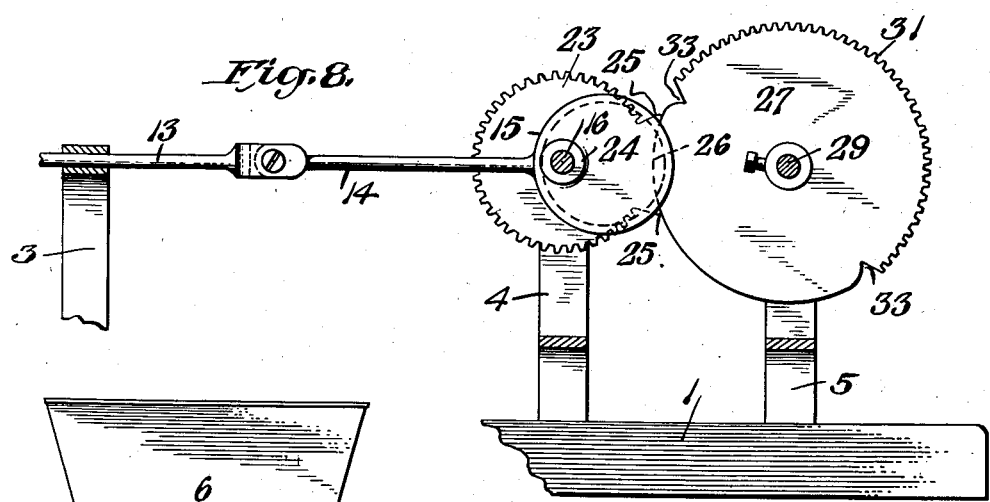
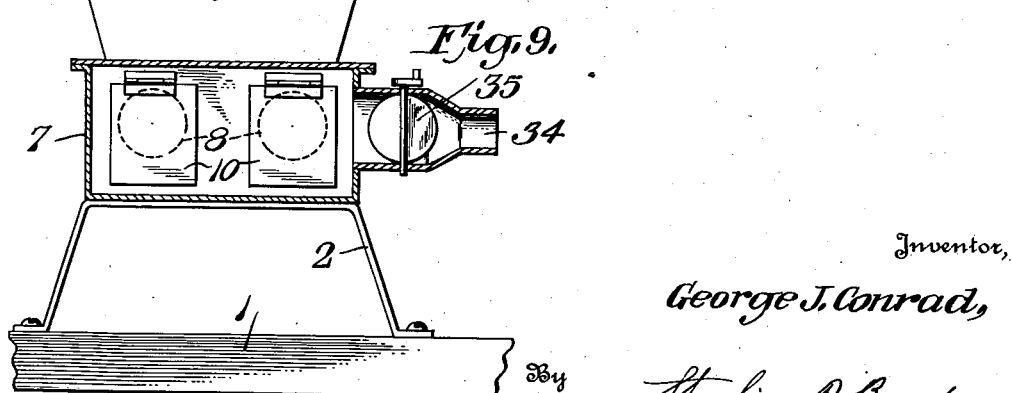
Inventor,
George J. Conrad,
By
Sterling P. Buck,
Attorney.

Patented Nov. 10, 1925.

1,560,666

UNITED STATES PATENT OFFICE.

GEORGE J. CONRAD, OF BALTIMORE, MARYLAND.

PLASTERING MACHINE.

Application filed May 11, 1925. Serial No. 29,595.

*To all whom it may concern:*

Be it known that I, GEORGE J. CONRAD, a citizen of the United States, residing at Baltimore, in the State of Maryland, have invented certain new and useful Improvements in Plastering Machines, of which the following is a specification.

This invention relates to plastering machines, and especially to an improved form of power-driven machine for forcing plaster or other plastic material through a conducting tube into a room or rooms, and into contact with all parts of the walls, ceilings, etc. of such rooms where the plastic material is to be applied.

One object of this invention is to provide a machine of this character with a very positive and exceedingly efficient and practical form of force pump which receives the plastic material from the hopper, and forces such material into a valved but otherwise tightly sealed chamber from which such plastic material passes to the various points of application.

Another object is to provide a machine of this character with a return passage from the sealed chamber to the hopper, and to provide means to open a valve or gate in such return passage simultaneously with closing a valve or gate in the passage or conduit through which the plastic material is forced to the points of application on walls, ceilings, etc.

Another object is to provide a comparatively simple and very convenient means whereby the said valves or gates can be operated by the person who is manipulating the feed conduit for applying the plastic material.

Another object is to provide an improved form of combined nozzle and trowel on said feed conduit, for applying and spreading the plastic material on walls or ceilings.

Other objects and important features will be pointed out or implied in the following details of description, in connection with the accompanying drawings in which:-

Fig. 2 is a side elevation of the machine, a part of the feed conduit and of the flexible shaft being broken off.

Fig. 3 is a horizontal sectional detail view in the plane of the centers of the plungers or pistons which force the material into the sealed chamber, and thence through the feeding conduit and return conduit or passage, according to the positions of the valves or gates in such conduits.

Fig. 4 is a transverse vertical section in the plane indicated at 4—4 of Figs. 1 and 3.

Fig. 5 is an enlarged fragmental detail view of the sealed chamber and its connections with the adjoining elements of the machine.

Fig. 6 is an enlarged detail view of the feed-controlling valve or gate and its operating mechanism.

Fig. 7 is an enlarged sectional detail view of the driving gear, and of the driven gear which is connected to one of the plungers or pistons, the section being taken along the line 7—7 of Figure 1.

Fig. 8 is a view similar to Fig. 7, and taken in the same plane, but showing the driven gear in its position of rest, whereas Fig. 7 shows it in its meshing position with respect to the driving gear, hence in position to be moved by movement of the driving gear.

Fig. 9 is a vertical sectional view, the section being taken in the line 9—9 of Fig. 1.

Fig. 10 is an enlarged side view of the nozzle and trowel combined.

Fig. 11 is an end view of the structure shown in Fig. 10, but reduced in size.

Referring to these drawings in detail, in which similar reference characters correspond to similar parts throughout the several views, and in which the present drawings illustrate one of the numerous forms covered by the inventive ideas, the present form is described in detail as follows:

Figure 1:
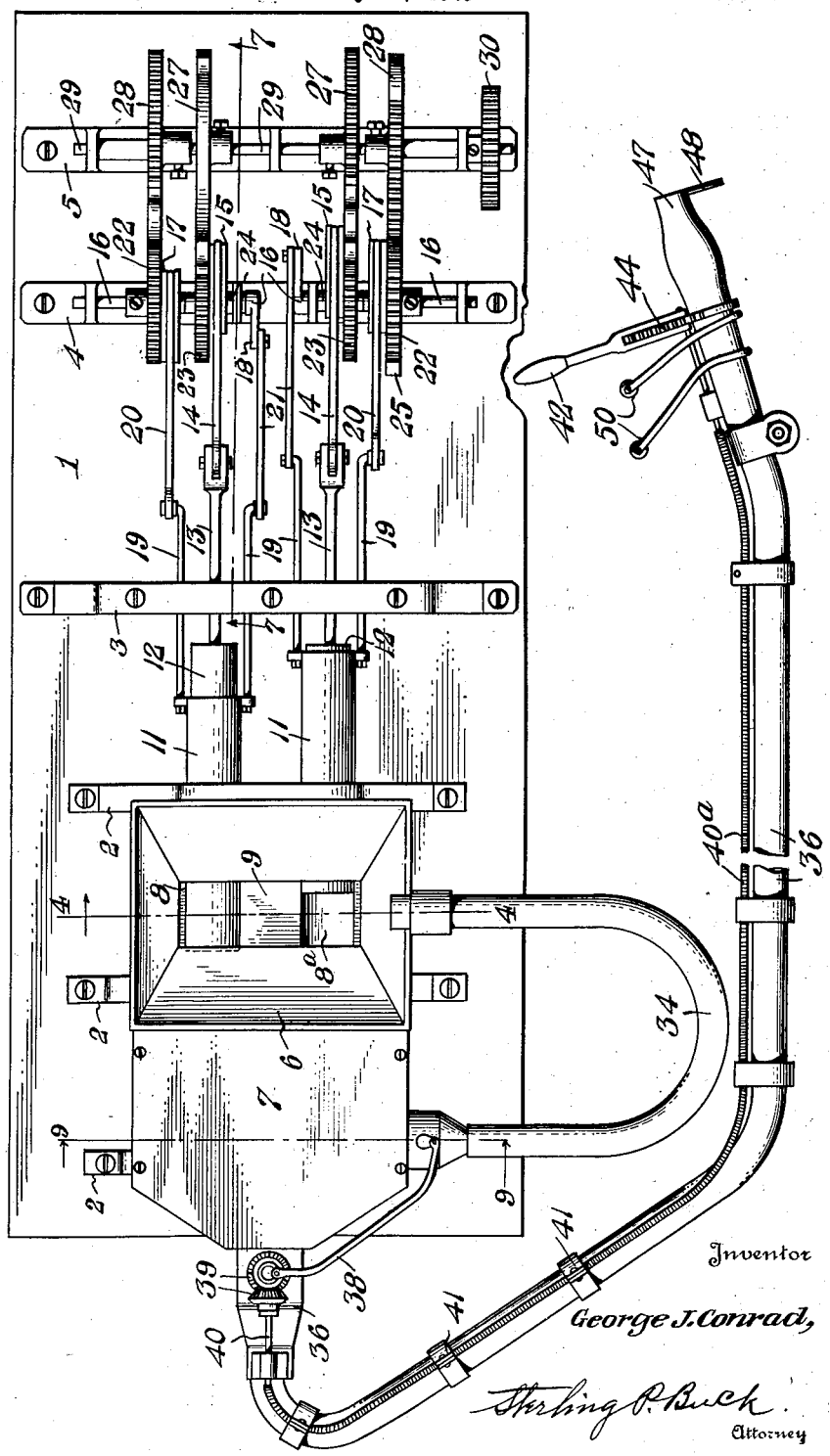
Figure 1 is a top plan view of the machine, a part being broken out of the base-plate, and a part being broken out of the feed conduit and the flexible shaft.

On a base 1, which may be mounted on wheels (not shown), a plurality of supporting frames 2, 3, 4 and 5 are secured by screws or other appropriate means, and these unite with the base 1 to constitute a main frame of the machine. The frame-member 2 includes or is rigidly united with a hopper 6, a sealed chamber 7 and two feeding cylinders or pump cylinders 8. These cylinders or tubes 8 are preferably connected by a bridge 9 which prevents plastic material from passing between them, and they are primarily open at both ends, but each is provided with a gate or check valve 10 across the end which communicates with the interior of the sealed chamber 7. The other end of each cylinder or feeding tube 8 is closed by one of the two forcing devices, and each of these forcing devices comprises a hollow cylinder or tube 11 and a plunger or piston 12. For operating these two forcing devices, two gearing mechanisms are employed, and as these two gearing mechanisms are of counterpart construction, the description of one will suffice for both, and such description is as follows:

A guiding rod 13 slides through a bearing in the frame member 3, and a connecting rod 14 is pivotally connected to the guiding rod 13, also operatively connected with an eccentric 15 which is carried by a shaft 16. A second eccentric 17 is mounted on the shaft 16, and one end of this shaft carries a crank 18. This crank has the same set and the same throw as the eccentric 17, and takes the place of an additional eccentric 17. In other words, the function of these two elements 17 and 18 is the same, viz, operatively connecting with the cylinder or tube 11 through the medium of guiding rods 19 and connecting rods 20 and 21. The crank 18 is used because it is less expensive than eccentric 17, and on the other hand, the eccentric 17 is used because it is on the intermediate part of the shaft 16, where a crank such as shown at 18 could not be used. In this connection it may be well to explain that the eccentric 17 and crank 18 are in fixed position with respect to one another and with respect to a gear-wheel 22, all three of these elements being fixed to rotate with the shaft 16; but the eccentric 15 is in fixed relation to a gear-wheel 23, on a sleeve 24, this sleeve being mounted to rotate on the shaft 16. The gear wheels 22 and 23 are of the "mangle gear" type, sometimes known as "mutilated gears", having gear teeth formed only a part of the way around its circumference, the other part of its circumference having formed thereon two enlarged teeth 25 which are connected by and merge with a concave part 26 (Figures 2, 7 and 8). The construction and form of the gear wheel 23 is substantially the same as that of the gear wheels 22, and these gear wheels mesh respectively with driving gear wheels 27 and 28, that is, the driven gear wheel 22 meshes with the driving gear wheel 28, and the driven gear-wheel 23 meshes with the driving gear-wheel 27.

The driving gear-wheels 27 and 28 are fixed with relation to one another and with relation to a shaft 29 with which they rotate, this shaft being driven by means of a spur-gear 30 or by other appropriate means for connecting the shaft 29 with any suitable form of engine, motor or other prime mover. This shaft 29 is mounted in suitable bearings which form elements of the frame member 5.

Having previously referred to the gearing of counterpart construction and having described them singly, it is now pointed out that the two pairs of gear-wheels 27 and 28 are united through the medium of the shaft 29 on which all of these driving gear-wheels are in fixed relation to one another. Each of these driving gear-wheels includes a toothed segment 31, a smooth convexed segment 32, and two notches or depressions 33, which notches receive the teeth 25, respectively, of the driven gear-wheels which mesh with the driving gear-wheels respectively. Because of the cooperative relation of the respective driving gears to the respective driven gears, the latter are caused to alternately rotate and rest while the driving gear-wheels continuously rotate under the influence of the actuating gear-wheel 30 and shaft 29. The construcion of each driving gear-wheel is subsantially the same as that of the other gear-wheel, but the setting or arcuate position of each driving gear-wheel is different from the setting or arcuate position of each of the other driving gear-wheels. This difference in settings or arcuate positions being necessary to perform the alternate operating movements necessary for the most efficient pumping or forcing of the plastic material from the feeding tubes 8 into the sealed chamber 7. In this connection, it should be understood that each feeding tube 8 is provided with an opening $8^a$ which communicates with the hopper 6, and that the plastic material passes by gravity and by suction from the hopper into each tube 8, through the respective openings $8^a$.

The operation of the mechanism thus far described is as follows:

Assuming that the eccentrics 15 and 17 and the cranks 18 (Fig. 1) are on dead center, the plungers or pushers 12 are both at their outermost position, and one of the tubular members 11 is at its outermost position, but the other one is at its innermost position. This same relation of parts is shown also in Figure 3, where it is seen that the forwardmost member 11 contains a considerable hollow space in its front end. However, assuming that the hopper 6 was filled with plastic material when this member moved to its forward position, and seeing that the corresponding opening $8^a$ admitted plastic material into the space below said opening, it will be also understood that the forward movement of this member 11 closed the corresponding opening $8^a$, at the same time causing this descended plastic material to fill the front end of the member 11. Again calling attention to the construction and relative positions of the "mangle gear" wheels, and to the fact that the eccentrics of this forcing mechanism are respectively in their foremost and rearmost positions, it will now be seen that when the driving gear wheels are turned over toward the rear of the machine, (or in a clockwise direction), the eccentric 15 will move from its rearmost to its foremost position, thereby forcing the plunger or piston 12 forward, and this forces the plastic material from the tubular member 11 into the sealed chamber 7. Assuming that this chamber was already filled with the plastic material, a corresponding amount of said material passed either through the gate of the feeding tube, or through the gate of the return tube, which tubes will presently be described. It should be understood that the corresponding gate 10 opened to admit the plastic material passed into the chamber 7, and that the other gate 10, being closed, prevented return of the plastic material therethrough. Now that the plunger 12 has reached its foremost position, the corresponding gear wheel 22 is moved (by its driving gear wheel 28) from its position of rest, and as it rotates for bringing the member 11 rearward, for opening the outlet 8ª, the corresponding wheel 23 is also rotated for causing its eccentric 15 to bring the plunger 12 rearward with this member 11, whereupon the relation of the members 11 and 12 is the same as that shown in the one (of the two counterpart mechanism) nearer the observer in Figure 1. While the farther one of these two mechanisms was operating as just previously described, the nearer one of these mechanisms reverses its relation, or assumes the position here shown by the farther one. In other words, now considering the operation of the nearer one of these mechanisms, and assuming that the space at 8ª is filled with plastic material, the gear-wheel 22 of this nearer mechanism causes its adjoined eccentric 17 and crank 18 to move the member 11 forward for filling its front end with the plastic material while closing the opening 8ª. During this forward movement of this member 11, the plunger or piston 12 thereof was held in its idle position in consequence of the smooth part of the driving gear 27 sliding in the concave part 26 of the corresponding driven gear; but now, when this member 11 has reached its forward position, it is held stationary by a similar sliding engagement of the driving gear 28 with the concave part 26 of the corresponding gear-wheel 22; and now, while this member 11 remains temporarily stationary, the teeth of the driving gear 27 (of this nearer mechanism) mesh with those of the corresponding member 23, causing the latter to rotate and carry the adjacent eccentric 15 forward for causing the corresponding plunger to push the material from the front end of this member 11 into the sealed chamber 7.

From the foregoing, it will be seen that each of the members 11 and 12 operates and rests alternately while all the driving gear-wheels 27 and 28 continue to rotate. It will also be seen that the openings 8ª are alternately opened and alternately closed by the members 11, and that each member 11 and its corresponding plunger 12 moves rearward simultaneously, thus creating a suction which assists gravity in forcing the plastic material through the openings 8ª into the spaces below these openings.

An important object of this invention is to enable the pumping or forcing device to continue operating without forcing the plastic material to the points of application when the operator desires to temporarily discontinue plastering or applying the plastic material and a further object is to continually mix the plastering material when it is not being applied, and thus keep it in proper condition. In carrying out these objects, I provide a return passage or tube 34 having a gate 35 therein. The rear end of this passage 34 is secured to the hopper 6 in position to empty or discharge into the hopper. The feeding pipe or passage 36 is provided with a gate 37. A rod 38 operatively connects with the gates 35 and 37 in such relation that when either of these gates is open, the other is closed. The gate 37 is provided with a gearing mechanism 39, comprising two intermeshing gear wheels, and one of these gear-wheels is rotatable with the gate 37, while the other is rotatable with a shaft 40. This shaft 40 includes a flexible part 40ª which extends approximately from end to end of the feeding tube 36, which latter is also flexible, and appropriate bearings 41 are provided for the flexible shaft 40ª, these bearings being mounted at suitable intervals on the feed pipe 36. A handle 42 is mounted on the outer end of the flexible shaft 40ª, which outer end is pivotally mounted at 43, having its bearing in a segment 44 which forms an element of a ratchet, the pawl of the ratchet being indicated at 45. This pawl is carried by the handle 42 and is normally pressed by a spring 46. The incline of the ratchet teeth is such that the handle 42 is held against any comparatively slight tendency of the flexible shaft 40ª to turn, but by exerting a considerable force on the handle 42, the holding tendency of the ratchet is overcome, and by means of this handle, the flexible shaft 40ª can be turned for operating the gearing 39 and thereby opening or closing the gate 37, at the same time closing or opening the gate 35. As soon as the handle 42 is turned for closing the gate 37, it simultaneously opens the gate 35, whereupon the plastic material ceases to flow through the feed pipe 36, and begins to flow through the return pipe 34.

The ratchet-segment 44 is fixed on a nozzle 47, and this nozzle is provided with a trowel 48. This trowel is preferably provided with a removable wear-plate 48ª, as shown in Figures 10 and 11, and the outer surface of this wear-plate is preferably slightly beyond the adjacent part of the flattened nozzle-mouth. The nozzle mouth is preferably bent inward toward the trowel, at 49, and this inwardly bent portion is preferably flush with the wear-plate 48ᵃ, thus not only directing the material towards the trowel, but also tending to avoid any space through which the material can pass at the opposite side of the nozzle from the trowel. By referring to Figure 11, it will be seen that the ends of the nozzle-mouth are more capacious than the middle part thereof, thus effecting the desirable spreading of the plastic material immediately before it encounters the trowel.

The nozzle 47 is provided with handles 50, these handles being preferably bail-shaped, and the hand-rolls 50ᵃ thereof extend transversely of the nozzle and in spaced relation thereto. They extend from the same side as that from which the segment 44 extends, so the handle 42 is in the most convenient relation with respect to these two supporting and wielding handles 50.

In operating a machine of this character, all parts thereof except the tube 36 and parts carried thereby, may be located on the ground or pavement outside of the building being plastered; and the free end of the feeding tube extends through a door or window of the building. The main part of this feeding tube may be supported by any appropriate means (not shown) while the nozzle 47 is wielded by the handles 50 for applying the plastic material and for causing the trowel 48 to spread the plastic material. In practice, the nozzle 48 may be used for merely roughly applying the plastering material, while an assistant plasterer may follow with appropriate finishing tools for smoothing or leveling the plaster thus applied. For plastering relatively tall buildings, this machine may be elevated to the upper part of the building, together with its driving engine or motor, and the feeding tube 36 may extend down into the different rooms to be plastered.

The prepared plastering material may be introduced into the hopper 6 by any appropriate means (not shown), such means being no part of this invention.

I have no intention of limiting my patent protection to the exact details of construction and arrangement here shown, for the inventive ideas include various constructions and arrangement of parts within the scope of the claims.

What I claim as my invention is:

1. In a plastering machine, the combination of a hopper, a sealed chamber, a valved passage to permit plastic material to pass from the hopper to the sealed chamber and to prevent return of the plastic material from the sealed chamber, means to confine a quantity of plastic material in said passage, and means to push the thus confined plastic material from said passage into said sealed chamber, said sealed chamber having an outlet, and a feeding tube for receiving the plastic material from said outlet and conveying it to a point of delivery or application of the plastic material.

2. The structure defined by claim 1, a gate in said outlet, said sealed chamber having a second outlet, a gate in the second outlet, means connecting these gates in such relation that each is closed when the other is open, means to operate the second said means for opening and closing these gates, and a return passage for conducting plastic material from the second said outlet back into said hopper, for the purpose specified.

3. In a device of the character described, the combination of a hopper, a sealed chamber, valved passages to receive material from said hopper and deliver the material to said sealed chamber and to prevent return of the material from the sealed chamber through said passages, means in each of said passages to confine a quantity of the material in these passages, pushers combining with these means and being operable to force the confined material into said sealed chamber, and and a gearing mechanism operable to alternately operate the said means and to alternately operate said pushers, said sealed chamber being provided with an outlet for delivery of said material.

In testimony whereof I affix my signature.

GEORGE J. CONRAD.